US009789540B2

(12) United States Patent
Illston

(10) Patent No.: US 9,789,540 B2
(45) Date of Patent: Oct. 17, 2017

(54) METHOD OF FORMING AN ARTICLE

(75) Inventor: Trevor John Illston, Malvern (GB)

(73) Assignee: MATERIALS SOLUTIONS LIMITED, Birmingham (GB)

( * ) Notice: Subject to any disclaimer, the term of this patent is extended or adjusted under 35 U.S.C. 154(b) by 1584 days.

(21) Appl. No.: 12/365,914

(22) Filed: Feb. 5, 2009

(65) Prior Publication Data

US 2009/0202378 A1 Aug. 13, 2009

Related U.S. Application Data

(60) Provisional application No. 61/028,208, filed on Feb. 13, 2008, provisional application No. 61/082,839, filed on Jul. 23, 2008.

(51) Int. Cl.
*B22F 3/105* (2006.01)
*B29C 67/00* (2017.01)

(52) U.S. Cl.
CPC ........ *B22F 3/1055* (2013.01); *B29C 67/0077* (2013.01); *B22F 2998/00* (2013.01); *Y02P 10/295* (2015.11)

(58) Field of Classification Search
None
See application file for complete search history.

(56) References Cited

U.S. PATENT DOCUMENTS

| 5,216,616 | A | * | 6/1993 | Masters | 264/401 |
| 5,253,177 | A | * | 10/1993 | Saito et al. | 700/119 |
| 5,595,703 | A | * | 1/1997 | Swaelens et al. | 264/401 |
| 5,637,175 | A | * | 6/1997 | Feygin et al. | 156/264 |
| 6,143,293 | A | * | 11/2000 | Weiss et al. | 424/93.7 |
| 6,482,576 | B1 | | 11/2002 | Farnworth et al. | |
| 6,630,093 | B1 | * | 10/2003 | Jones | 264/401 |
| 6,764,636 | B1 | * | 7/2004 | Allanic et al. | 264/401 |
| 6,884,486 | B2 | * | 4/2005 | Estrin et al. | 428/45 |
| 7,084,370 | B2 | * | 8/2006 | Hagemeister et al. | 219/121.85 |
| 2003/0043360 | A1 | | 3/2003 | Farnworth | |
| 2004/0031780 | A1 | | 2/2004 | Hagemeister et al. | |
| 2004/0239009 | A1 | * | 12/2004 | Collins et al. | 264/497 |
| 2005/0208168 | A1 | * | 9/2005 | Hickerson et al. | 425/174.4 |
| 2005/0275129 | A1 | * | 12/2005 | Sambu et al. | 264/113 |
| 2006/0208377 | A1 | | 9/2006 | Chen | |
| 2017/0072466 | A1 | * | 3/2017 | Zehavi | B22F 3/1055 |
| 2017/0072467 | A1 | * | 3/2017 | Zehavi | B22F 3/1055 |

FOREIGN PATENT DOCUMENTS

| EP | 0686480 | A2 | 4/1989 |
| EP | 1279480 | A1 | 7/2002 |
| EP | 1486318 | A1 | 12/2004 |
| EP | 1486318 | A2 | 12/2004 |

OTHER PUBLICATIONS

P. Kenkel, J. Engquist, M. Blanton, "Quality Control and Inspection of Powder Metallurgy Secondary Operations," ASM Handbook, vol. 7: Powder Metal Technologies and Applications, ASM International, 1998.*

* cited by examiner

*Primary Examiner* — Scott Kastler
*Assistant Examiner* — Vanessa Luk
(74) *Attorney, Agent, or Firm* — Beusse Wolter Sanks & Marie

(57) ABSTRACT

From one aspect, a method of forming a support for use in a selective sintering or melting process includes forming a body on a platen having a plurality of generally parallel channels each channel being open at least one end. The base of the channels may be formed by the platen. Preferably the support is formed by a selective sintering or melting process.

15 Claims, 5 Drawing Sheets

METHOD OF FORMING AN ARTICLE

BACKGROUND AND SUMMARY

This invention relates to a method of forming an article.

The laser or electron beam sintering/melting of powdered materials to form solid parts is now well known—though not so well known as for there to be an established nomenclature. In particular there are commercial powder bed 'Selective Laser Sintering'/'Selective Laser Melting' (SLS/SLM) machines such as the M270 produced by Electron Optical Systems (EOS) M270 and the Realizer II marketed by MCP. These take metal powders under an inert atmosphere and direct a $CO_2$ or fibre laser onto a layer of powder.

There are also other similar powder bed machines sometimes using an electron beam and somewhat related processes where there is no bed of powder, but the powder is ejected from a nozzle proximate the laser such as in the Trumpf DMD 505. These processes are called such things as 'Direct Laser Fabrication' or 'Direct Metal Deposition'.

In the 'powder bed' processes a point source of energy such as a laser or electron beam is selectively applied to a layer of powder and in related processes a powder/thermal source is directed as required on a layer by layer basis to build up a 3D part from a 'slicing' of a design file. In both cases the heat from the thermal source melts or sinters the powder layer by layer to form a solid that may be further processed to fully solidify or render useful by various means not relevant to this disclosure.

In these methods whilst it is possible to build complex parts it is however not possible to commence the building of a part in the bulk of a powder bed or free space—the powder must be melted and fused to a solid structure. And in the case of building a free standing object (as opposed to repairing an existing object by adding material) this commences with a platen upon which powder is melted/sintered and fused.

There are numerous well known reasons why the desired part must start at a solid object and these include:

1. The as-built part contains significant thermally induced stresses capable of bending a 36 mm thick 250 mm by 250 mm tool steel platen- or delaminating the built part away from the platen if the interface is not sufficiently strong.
2. Addressing the point source of heat to a bed of powder causes the powder to locally melt and then ball up into 'weld spatter' unless it is able to wet and adhere to an existing solid object. This also means that certain shapes require 'scaffolding' of supports extending from a solid part to enable wetting and mechanical stability.

Given that the desired part to be built must be attached to a platen then there must also be an intermediate layer which provides a thickness in which a cut can take place to separate the part, once built, from the platen. It is therefore the case that the prior art includes support structures and these have consisted of solid material, hollow shells and a cross hatched structure of discrete walls called 'EOSTYLE' supports.

After completing the build of a part there may be voids containing unmelted powder contained between the formed shape made of melted powder and the platen. And in the case of non solid supports there will be unmelted powder contained within them. This unmelted powder presents numerous problems to subsequent processing.

Firstly, to remove the stresses inherent in the as-built part a thermal process is needed for all but the smallest parts (such as dental inlays) whilst the part is still firmly attached to the platen. Some desirable thermal processes are sufficiently hot as to melt the loose powder thereby solidifying it in enclosed voids.

Secondly, to cut the part from the platen may require a wire Electrical Discharge Machining (EDM) process, particularly for hard alloys such as cobalt chrome. Loose powder contained within voids shorts out the wire in the EDM process presenting significant difficulties and additional costs for this process.

Thirdly, if cutting with a saw, lubricant may be used and the loose powder then mixes with the lubricant creating difficulties.

Fourthly, the metal powder may be hazardous to health, or valuable (such as in the case of titanium alloys). Hazard control and powder recycling is best performed prior to further processing.

For these and other reasons it is therefore advantageous to have a method of removing powder contained within voids whilst the built part is still attached to the base plate and before heating or cutting operations—and yet the part must be firmly attached to the base plate because of the thermal stresses inherent in the process.

It is not trivial to conceive of support structures that meet the requirement of:

1. Enabling substantially all trapped loose powder to be removed by e.g. gravity, tapping, vacuum or blowing and,
2. Providing a sufficiently firm anchorage during building of the part to the platen to resist delamination and,
3. Not being a solid—(which is time consuming to build and negates much of the benefit of the process-cutting a solid support from a complex solid shape is difficult and costly and negates a benefit of the powder process) and,
4. Is capable of being reliably produced by the laser sintering/melting process.

In particular it should also be understood that the laser sintering/melting process is not capable of making any and all structures and in particular cannot reliably make free standing thin pillars.

From one aspect the invention is an intermediate grooved or channelled solid layer that is built by the laser sintering/melting process between the platen and the desired part built.

This built channelled layer is either an intermediate layer below the prior art supports and/or is at least a part of the support itself including an entirely solid support with channels. If the deposition process is a powder bed process (using a recoater blade) then preferably the grooves/channels are built to lie in the line of traverse of the recoater blade. The grooves/channels are sufficiently wide as to allow loose powder to be removed whilst the built part is still attached to the base plate and before any further processing.

Typically the powder used in a laser sintering/melting process is spherical and of a D50 of 20-100 microns and in particular has a mean diameter of about 50 microns. A groove or channel that can be reliably built by the process is of the order of 0.5 mm in width.

A preferable grooved structure is of a 0.5 mm wall/rib thickness and 0.5 mm gap giving a 50% solid upper surface.

Surprisingly a 50/50 0.5 mm rib/gap structure is both physically sufficient to build solid parts upon (i.e. the laser sintering/meting process can bridge the gaps) and strong enough to prevent delamination of built parts from the platen either during the build process or during a subsequent heat treatment. Also, the 0.5 mm walls of the support are relatively easy to remove from the built parts.

From another aspect the invention consists in a method of forming a support for use in a selective sintering or melting process including forming a body on a platen having a plurality of generally parallel channels each channel being open at least one end. The base of the channels may be formed by the platen. Preferably the support is formed by a selective sintering or melting process.

According to a further aspect the invention includes a support for use in the selective sintering or melting process including a plurality of spaced generally parallel walls defining grooves or channels therebetween each groove or channel being open at least one end thereof.

From a still further aspect the invention consists in a method of forming an article utilising a selective sintering or melting process including:
(a) building by means of a selective sintering or melting process a support defining a plurality of generally parallel channels open at least one end on a platen;
(b) building an article on top of the support;
(c) removing loose material from the channels through the open ends; and
(d) heat treating the article.

The method may further include cutting the support from the platen and subsequently removing the article from the support. The article and support may be formed, in part, contemporaneously.

The support may be made using a method including forming layers of powder using a powder recoater blade which traverses the platen and wherein the channels or grooves are substantially aligned with the direction of travel of the blade.

This alignment in particularly beneficial because it reduces any lateral forces applied to the walls by the blade.

The arrangement described above is suitable for forming many objects, but when the article has a significant length in one dimension it has been found that the internal stress in the support can cause the walls, which define the grooves, to be pulled inwardly.

Thus from another aspect the invention consists in a method of forming a support for use in a selective sintering or melting process including forming, on a platen, a support having a plurality of generally grooves or channels, each groove or channel being open at least one end.

Preferably by a selective sintering or melting process.

The invention also includes a support for use in a selective sintering or melting process including a plurality of spaced generally parallel walls defining grooves or channels therebetween each groove or channel being open at least one end thereof. Alternatively the support may be formed in a criss cross web. For example the web may be made up of two sets of parallel walls, the sets being mutually inclined so that they intersect periodically.

The invention also consists in a method of forming an article utilising a selective sintering or melting process including:
(a) building by means of a selective sintering or melting process a support defining a plurality of generally parallel grooves or channels open at least one end of a platen;
(b) building an article on top of the support;
(c) removing loose material from the channels through the open ends; and
(d) heat treating the article.

In this method the support may be as defined above or formed by the method set out above or below in any event the article and the support may be formed in part contemporaneously.

The support may be made using a method including forming layers of powder using a powder re-coater blade which traverses the platen and wherein the channels or grooves are substantially aligned with the direction of travel of the blade.

From a further aspect the invention may include a method of forming a support for use in sintering including forming on a platen a support defining plurality of generally parallel grooves or channels each being open at least one end wherein the grooves are defined between walls which are progressively formed in a criss cross web.

The web may be made up of two sets of parallel walls, the sets being mutually inclined so that they intersect periodically.

The method may include building a series of aligned blocks of supports with a gap between adjacent ends of the support such that the channels or grooves debouch into the gaps.

The face of at least one support, which defines one wall of the gap may be inclined relative to the length of the groove or channel such that a re-coater blade travelling in the direction of the face with not impinge on the full width of the support simultaneously. The angle of inclination may be about 5°.

Although the invention has been defined above it is to be understood it includes any inventive combination of the features set out above or in the following description.

BRIEF DESCRIPTION OF THE DRAWINGS

The invention may be performed in various ways and specific embodiments will now be described, by way of example, with reference to the accompanying drawings, in which.

DETAILED DESCRIPTION OF EMBODIMENTS

Figure 1:
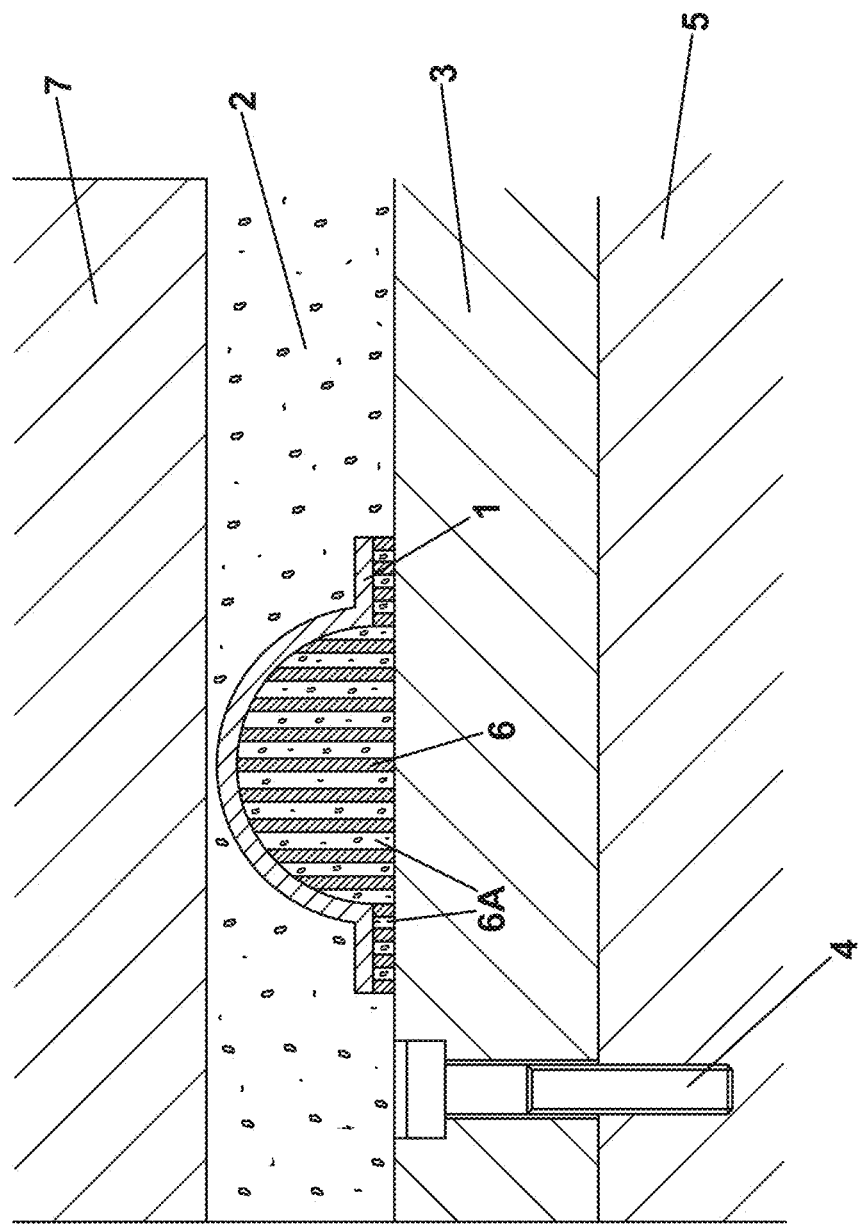
FIG. 1 is a side view of part of selective sinter or melt powder forming apparatus with a formed article shown.

FIG. 1 is a diagrammatic view at the completion of the build of a solid object 1 formed by the solidification of powder 2 by the application of a point source of heat (not shown) in a layer wise process. The building commences at a platen 3 bolted by bolt 4 to an elevator platform 5 within a powder bed machine. To enable the solid object to be built and allow a cutting gap between the object and the platen a support structure is needed. The support structure of the invention is shown at 6 being a solid support with grooves or channels 6a that contain loose powder 2. The grooves or channels are orientated such that they line along the line of traverse of the powder recoater blade 7. The grooves or channels are open at least one end so that powder can be removed from them, e.g. by vacuum, prior to heat treatment of the article or object 1.

Figure 2:
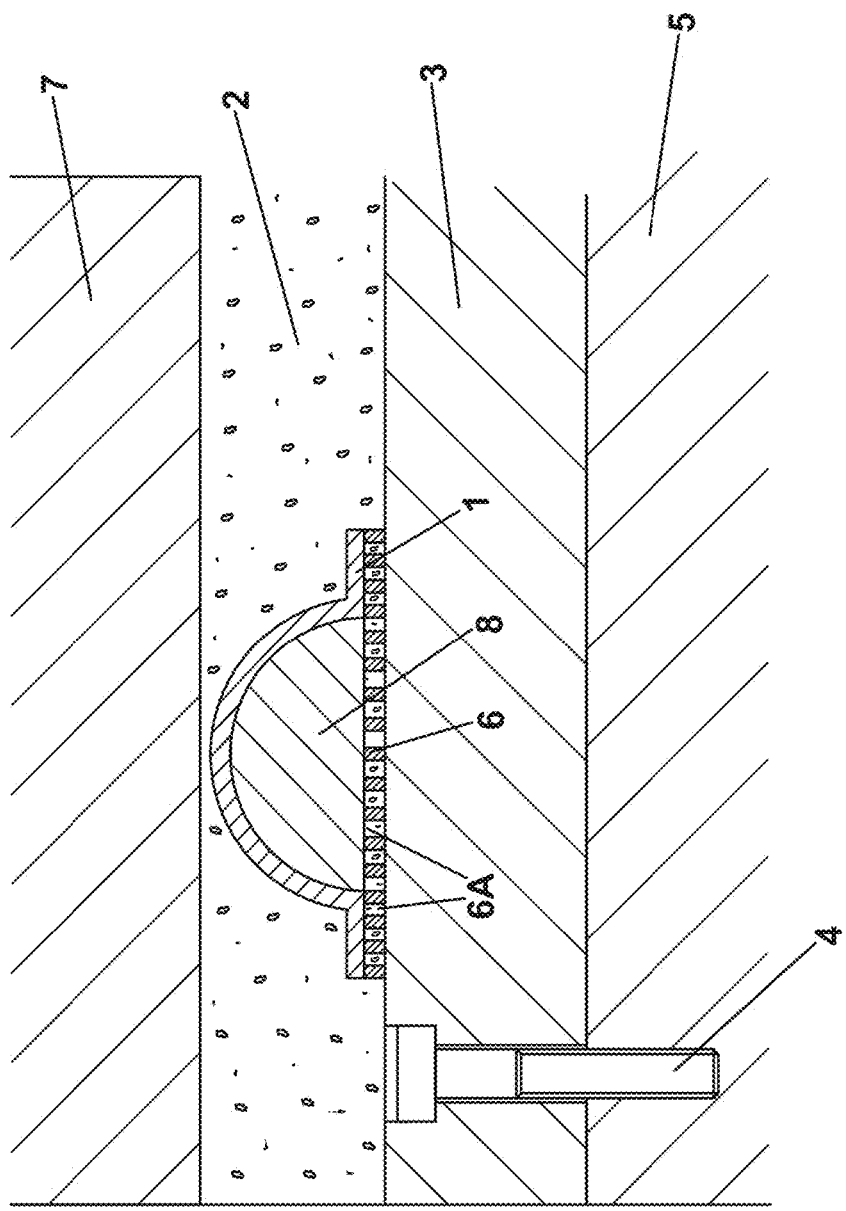
FIG. 2 is a corresponding article with a different support structure.
Figure 3:
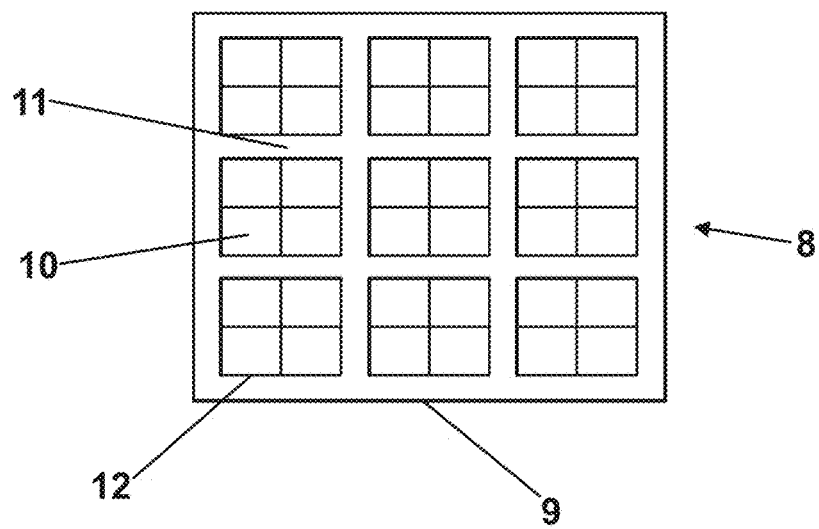
FIGS. 3 and 4 are respective plan and side views of prior art support structures.

FIG. 2 again shows a support structure of an embodiment of the invention at 6 as a discrete layer below a support structure 8 of the prior art. A plan view of this prior art support 8 is shown at FIG. 3 (prior art). Here is shown an "EOSTYLE" support generated by a module within the "Magics" software produced by Materialise, Leuven, Belgium. The software generates a 'Manhattan' style of support consisting of thin walls 12 and contained voids 10. Around blocks of walls there can be selectable gaps 11 and the whole is enclosed by a selectable outer wall 9. The distance between the walls 12 is also selectable and is typically 1 mm. The purpose of the gaps 11 is to enable the 'Manhattan' blocks made of thin walls 12 to be easily snapped off the built part 1 by hand or using hand tools.

Figure 4:
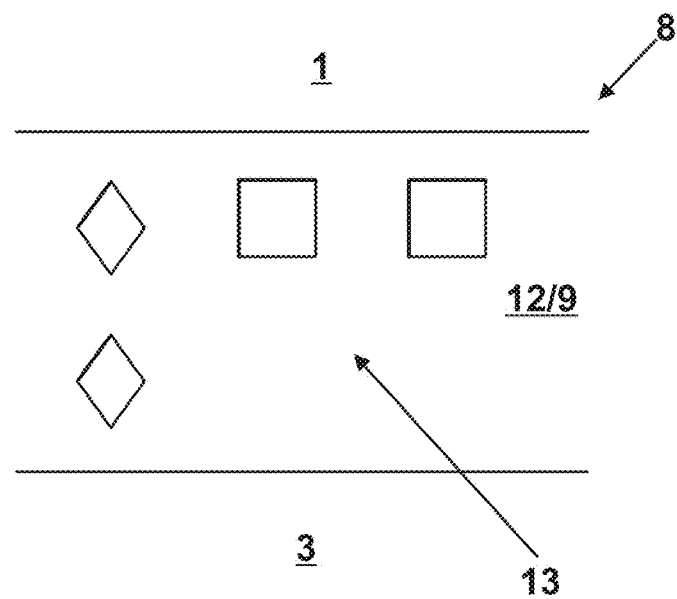

The trapping of powder is a known problem and the intended solution within the EOSTYLE support is shown at FIG. 4 (prior art). This is a view of a wall 9/12 of the EOSTYLE support 8 of the prior art with the platen 3 and the built part 1. holes 13 of a diamond or square shape can be added for the intended purpose of releasing powder. Unfortunately it is impractical to get the powder from an enclosed solid support 8 through these holes and if the hole size is enlarged the support structure does not build reliably.

Figure 5:
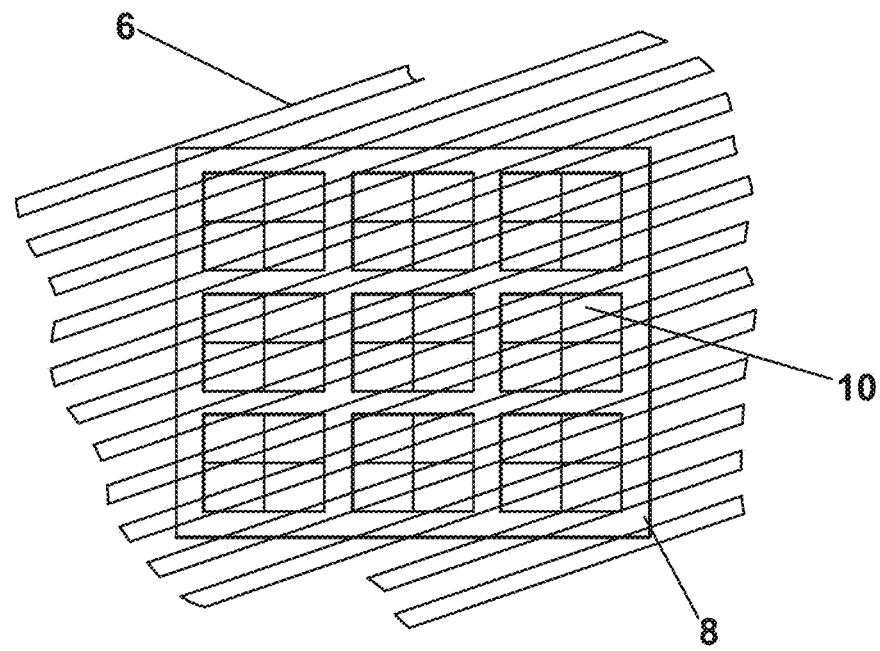
FIG. 5 is a schematic view from below of a support structure of the invention with a prior art support structure mounted on top thereof, for example as indicated in FIG. 2.

As shown in FIG. 5, the structure of support 6 allows powder to drain vertically down the relatively large gaps 10 of the prior art support 8 into the grooves 6a of support 6 where it can readily be removed through the open ends rather than having to attempt to have it pass laterally through multiple walls 12 via holes 13 as in the prior art.

As these walls of support 8 are typically at 1 mm spacing (and need to be frequent to act as a sufficient support to resist thermal stresses in part 1 as it is built and attempts to delaminate from platen 3) then a 100 mm wide part will have ~100 walls 12 with holes 13 for powder to pass if it is to drain from the prior art support structure 8. In practice the powder is not substantially removed in an economic time scale.

It should also be understood that it is not possible in this software to select solid blocks. Experimentally solid blocks have been created by other means to attempt to form an array of pillars (as they are layer-wise constructed vertically). These pillars do not build successfully In the powder bed equipment, presumably due to the interaction of the recoater blade 7 and powder 2 knocking them over mid build. In a blown powder system thin pillars are impracticable as they would require extremely rapid laser switching and/or powder switching as the laser head scanned across a surface.

Figure 6:
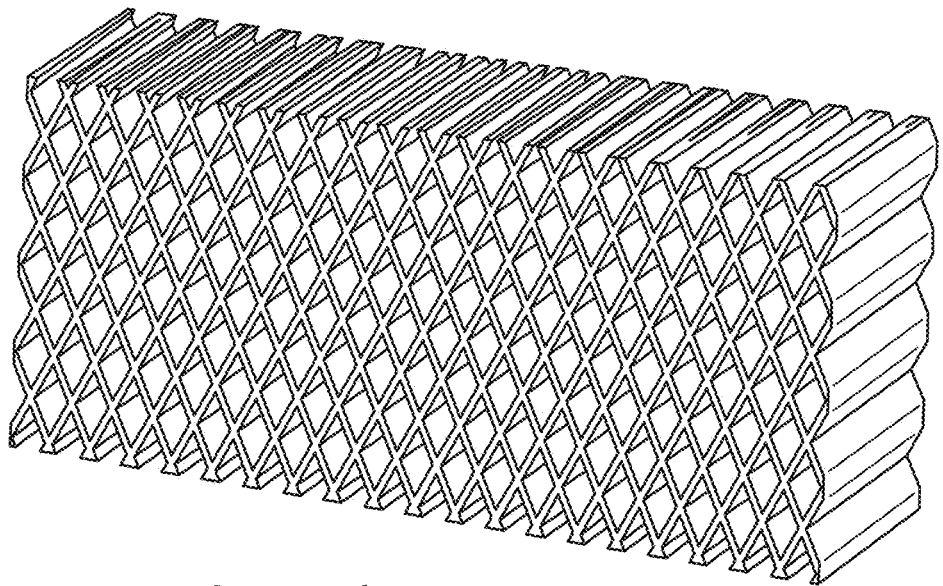
FIG. 6 which is of a second embodiment of a support.
Figure 7:
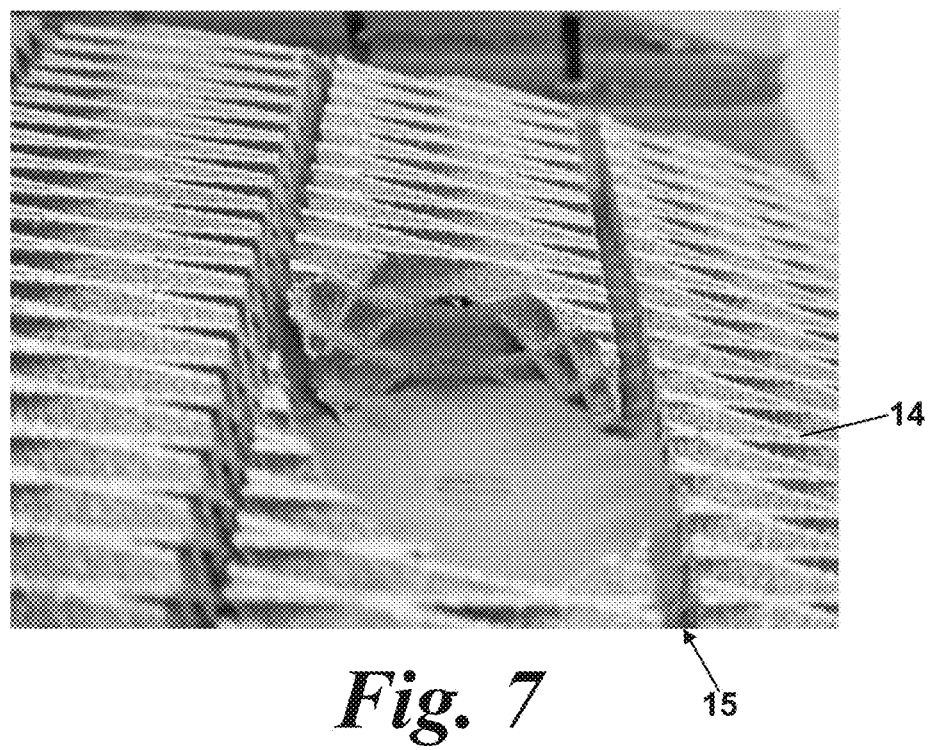
FIG. 7 is a view taken of such a support from one end and shown aligned with further such supports.
Figure 8:
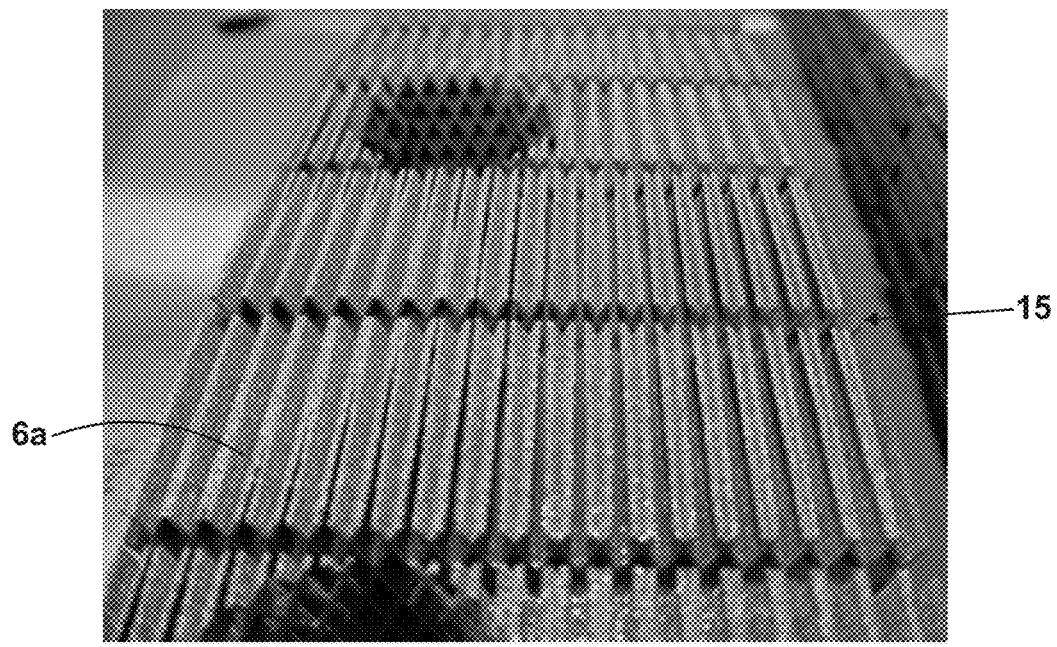
FIG. 8 is a view of an assembly such as illustrated in FIG. 7 looking along the length of the grooves.

Turning to FIGS. 6 to 8 embodiments are described, which are particularly suitable for use in constructing an article of significant length in one direction.

It should be understood that the most useful supporting structures are not only functional but also quick to form on commercially available equipment. Most laser sintering/melting systems use a galvometer to scan the laser beam, though a Cartesian system of x/y motion with a mounted laser or laser projecting device such as a mirror or fibre optic is also used. These systems are all much faster to scan a laser beam along one axis than to draw complex shapes such as crosses, circles etc. that require complex computation and motion along two axis.

FIG. 6 shows a variant of the invention being a crisscrossed structure formed by tipping the walls 12 on their side such that they cross vertically.

FIGS. 7 and 8 shows from 2 directions the same support of FIG. 6 of this invention for a generally curved object and illustrates the level of contact and cross linking of this support structure under a curved object 1 to be supported (against mechanical and thermally driven forces) during building and further thermal processing if required.

It has been found when making parts with high internal structures e.g. greater than 50 mm that the support walls of the invention are improved by tipping them at an angle to create cross linking e.g. as shown in FIG. 6. This structure, whilst it can look complex, is still formed by scanning only a single axis.

This crisscrossed support provides both stability during building high structures and also against shrinkage in the cross-wise direction of the attached built part e.g. during thermal processing. This criss-cross supporting of walls does not need to extend throughout the full height of the support to be effective.

Clearly the interlinking of the walls will now block the downward flow of loose powder necessary to allow its removal, and therefore the cross linking is not continuous and indeed all or part of the support structures may be broken into blocks of between 5 mm and 100 mm, typically 20 mm to allow the loose powder to be removed via a gap 15 of 0.3 mm and 5 mm, typically 1 mm.

The interlinking thin walls 12 of structure 14 have a section thickness of between 0.3 mm to 5 mm, typically 0.5 mm. The 'line' spacing is 1-2 mm, typically 1 mm or less and preferably between 0.3 mm to 5 mm. The angle of the line taken by the interlinking structures is between 5 deg and 35 deg from vertical, typically 25 deg.

The grooves/walls are set at an angle of typically 5 deg to the motion of the re-coater blade 7 to distribute the forces more evenly.

The grooves/walls may extend outside the footprint of the object 1 and in which case their top leading edge may be rounded off- to help avoid them being chipped off by the re-coater blade 7 and driven into the object 1 during build.

The thin walls of the invention, whilst drawn as straight lines in the vertical axis may be curved, wavy or angular and the gaps thereby formed may take on any geometric shape, though the structures as shown are preferred and those familiar with the art will understand the limitations the technology places on the forming of various unsupported geometric shapes. In particular, shallow angles (from horizontal) e.g. the tops of circles are not well formed, whereas sharp points as illustrated build well.

What is claimed is:

1. A method of forming an article, comprising:
   (a) building a support on a platen by a first selective melting or sintering process,
   wherein the support defines a plurality of generally parallel contiguous grooves or channels which extend lengthwise between opposite ends parallel to a surface of the platen,
   the grooves or channels are defined by a plurality of intersecting walls which are inclined relative to a direction perpendicular to the surface of the platen and
   at least one of the opposite ends of each groove or channel is open to expose an interior of the groove or channel;
   (b) building an article on top of the support by a second selective sintering or melting process that attaches the article as it is built to the support,
   wherein each of the first and second processes includes selectively sintering or melting metallic powder, and
   at least one of the first and second selective sintering or melting processes includes moving a powder recoater blade in a first direction parallel to a surface of the platen across metallic powder lying on the surface of the platen to form layers of the metallic powder on the platen, and sintering or melting selected portions of each of the layers of metallic powder;

(c) actively removing loose metallic powder of the at least one of the first and second selective sintering or melting processes from the grooves or channels through the open ends of the grooves or channels while the article is attached to the support; and (d) heat treating the article after removing the metallic powder from the grooves or channels and while the article is attached to the support.

2. The method as claimed in claim 1, including cutting the support from the platen and subsequently removing the article from the support.

3. The method as claimed in claim 1, wherein both of the first and second selective sintering or melting processes include moving the powder recoater blade in a first direction parallel to a surface of the platen across metallic powder lying on the surface of the platen to form layers of the metallic powder on the platen, and sintering or melting selected portions of each of the layers of metallic powder such that the article and the support are formed in part contemporaneously.

4. The method as claimed in claim 1, wherein the grooves or channels include a plurality grooves or channels stacked over the platen and extending in the first direction parallel to the surface of the platen.

5. The method as claimed in claim 4, wherein a cross-section of the support defines a crisscross pattern, the cross-section lying in a plane perpendicular to the first direction and perpendicular to the surface of the platen.

6. The method as claimed in claim 1, wherein both of the opposite ends of each groove or channel is open to expose an interior of the groove or channel.

7. The method as claimed in claim 1, wherein the loose metallic powder is removed by a vacuum.

8. The method as claimed in claim 1, wherein the support is built such that the length of each groove or channel, in a lengthwise direction in which the grooves or channels are parallel, is greater than a width of the groove or channel in a direction perpendicular to the lengthwise direction.

9. A method of forming an article, comprising:
   building a support on an upper surface of platen by a first selective sintering or melting process,
   wherein the support has a top, a bottom, opposite ends spaced from each other in a first direction parallel to a surface of the platen, and two sets of parallel walls defining a plurality of generally parallel grooves or channels,
   each of the walls are inclined relative to a direction perpendicular to the upper surface of the platen, and the walls of one of the sets intersect the walls of the other of the sets such that the cross section of the support in a plane perpendicular to the first direction and to the upper surface of the platen has a crisscross pattern each of the grooves or channels is contiguous and elongated in the first direction, and is open at one or both of the opposite ends of the support, and
   the top of the support is constituted by ribs of the walls and upper openings of respective ones of the grooves or channels, each of the ribs being elongated and extending contiguously in the first direction from one of the opposite ends of the support to the other, the ribs being spaced from each other in substantially a second direction perpendicular to the first direction, and the upper openings of the respective ones of the grooves or channels being delimited by the ribs such that the respective ones of the grooves are exposed at the top of the support in addition to being exposed at one or both of the opposite ends of the support;
   building an article on top of the support by a second selective sintering or melting process that attaches the article as it is built to the support; and
   actively removing powder used in at least one of the first and second selective sintering or melting processes from the grooves or channels through the open ends of the grooves or channels while the article is attached to the support.

10. The method as claimed in claim 9, wherein the selective sintering or melting processes use metallic powder to build the support and the article, respectively, and further comprising heat treating the article after removing loose metallic powder from the grooves or channels and while the article is attached to the support.

11. The method as claimed in claim 9, wherein the first selective sintering or melting process includes moving a powder recoater blade in substantially the first direction across powder on the upper surface of the platen to form a plurality of layers of the powder on the platen, and sintering or melting selected portions of each the layers of powder.

12. The method as claimed in claim 11, wherein the selective sintering or melting processes use metallic powder to build the support and the article, respectively, and further comprising heat treating the article after removing loose metallic powder from the grooves or channels and while the article is attached to the support.

13. The method as claimed in claim 9, wherein 50% of the top of the support is constituted by the ribs and 50% is constituted by the upper openings of the respective ones of the grooves or channels.

14. The method as claimed in claim 9, wherein the powder is removed by a vacuum.

15. The method as claimed in claim 9, wherein the walls of the support are built such that they each have a substantially uniform thickness and such that the length of each groove or channel, in a lengthwise direction in which the grooves or channels are parallel, is greater than a width of the groove or channel in a direction perpendicular to the lengthwise direction.

* * * * *